(12) United States Patent
Hsu

(10) Patent No.: US 7,386,635 B2
(45) Date of Patent: Jun. 10, 2008

(54) ELECTRONIC DEVICE CIRCUIT HAVING A SENSOR FUNCTION FOR EXPANDABLY CONNECTING A PLURLITY OF ELECTRONIC DEVICES

(75) Inventor: Chun-Pin Hsu, Tu-Chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 560 days.

(21) Appl. No.: 10/900,860

(22) Filed: Jul. 27, 2004

(65) Prior Publication Data

US 2005/0097230 A1  May 5, 2005

(30) Foreign Application Priority Data

Nov. 4, 2003 (TW) .............................. 92130730 A

(51) Int. Cl.
  *G06F 13/00* (2006.01)
  *G06F 3/00* (2006.01)
(52) U.S. Cl. ................... 710/3; 710/1; 710/2; 710/4; 710/5; 710/300; 703/25; 703/27
(58) Field of Classification Search .............. 710/1–5, 710/300; 703/25, 27
  See application file for complete search history.

(56) References Cited

U.S. PATENT DOCUMENTS

| 5,970,240 | A | * | 10/1999 | Chen et al. ................... 703/25 |
| 6,339,806 | B1 | | 1/2002 | Foster et al. |
| 7,092,041 | B2 | * | 8/2006 | Lendaro ..................... 348/705 |

* cited by examiner

*Primary Examiner*—Tammara Peyton
(74) *Attorney, Agent, or Firm*—Wei Te Chung

(57) ABSTRACT

An electronic device (120) includes: an input connector (121), including at least three address pins and plural data pins; a function chip (123), including address pins and data pins corresponding to those of the input connector, and directly connected to the input connector by the data pins thereof; an adder disposed between the input connector and the function chip, and including at least three input pins and at least three output pins, the input pins being connected to the address pins of the input connector of the electronic device in one-to-one correspondence, the output pins being connected to the address pins of the function chip; and an output connector (124), including at least three address pins and plural data pins, the address pins being connected to the output pins of the adder in one-to-one correspondence, the data pins being respectively connected to the data pins of the input connector.

10 Claims, 2 Drawing Sheets system for expandably connecting electronic devices

ELECTRONIC DEVICE CIRCUIT HAVING A SENSOR FUNCTION FOR EXPANDABLY CONNECTING A PLURLITY OF ELECTRONIC DEVICES

BACKGROUND OF THE INVENTION

1. Field of the Invention

The present invention pertains to circuits for connecting electronic devices, especially to circuits and systems for expandably connecting electronic devices.

2. Background of the Invention

Today, electronic systems such as computer systems are used by more and more people at their place of work or in their home. In such electronic systems, various integrated circuits (ICs) or chips are connected to a computer Central Processing Unit (CPU) via a computer bus. The integrated circuits or chips may be input/output processors, function generators, memories, or sensors for detecting physical and/or chemical changes. Each chip is assigned a unique bus address, which can distinguish the chip from other chips.

In particular, the above-mentioned chips generally have some address pins, which can be manually set to have high or low input voltage levels. In this way, a unique address can be assigned to each chip connected to the computer bus.

FIG. 2 shows a structure of a commonly used system 200 for expandably connecting electronic devices. Plural chips 220, 230, 240 and 250 are connected in parallel to a computer bus, and in turn are collectively connected to a control chip 210. The logic high input voltage corresponds to the logic 1 state, and the logic low input voltage corresponds to the logic 0 state. In order to assign each chip a unique address, three address pins $A_0$, $A_1$ and $A_2$ of the chip 220 are set as low voltage level. Therefore, the address of the chip 220 is "000." An address pin $A_0$ of the chip 230 is set as high voltage level, and the remaining address pins $A_1$ and $A_2$ are set as low voltage level. Therefore, the address of the chip 230 is "100." The address pins $A_0$ and $A_2$ of the chip 240 are set as low voltage level, and the address pin $A_1$ is set as high voltage level. Therefore, the address of the chip 240 is "010." The address pins $A_0$ and $A_1$ of the chip 250 are set as high voltage level, and the remaining address pin $A_2$ is set as low voltage level. Therefore, the address of the chip 250 is "110."

The system 200 avoids disparate configurations of bus addresses being created for all the chips 220, 230, 240 and 250 connected to the computer bus. However, the system 200 requires that the bus addresses be preset during the manufacturing of the associated printed circuit board (PCB). Therefore when a new chip is required to be added to the same computer system, a new PCB containing the new chip must be manufactured. This limitation adds to costs and takes up considerable time. Thus, a circuit and system that overcome the aforementioned disadvantages are desired.

SUMMARY OF THE INVENTION

Accordingly, an object of the present invention is to provide an electronic device that can be expandably connected to a computing system.

Another object of the present invention is to provide a system for expandably connecting electronic devices, in which the electronic devices can be conveniently connected and disconnected.

In order to accomplish the above-mentioned first object, an electronic device comprises: an input connector, comprising at least three address pins and plural data pins; a function chip, comprising address pins and data pins corresponding to those of the input connector, and directly connected to the input connector by the data pins thereof; an adder disposed between the input connector and the function chip, and comprising at least three input pins and at least three output pins, the input pins being connected to the address pins of the input connector of the electronic device in one-to-one correspondence, the output pins being connected to the address pins of the function chip; and an output connector, comprising at least three address pins and plural data pins, the address pins being connected to the output pins of the adder in one-to-one correspondence, the data pins being respectively connected to the data pins of the input connector.

In order to accomplish the above-mentioned second object, a system for expandably connecting electronic devices comprises a control device and at least one electronic device. The control device comprises: a control chip, comprising at least three address pins and plural data pins; and a connector, comprising corresponding address pins and data pins to that of the control chip. Said electronic device, comprises: an input connector, comprising at least three address pins and plural data pins respectively connected to corresponding pins of the connector of the control device; a function chip, comprising address pins and data pins corresponding to those of the input connector, and directly connected to the input connector via the data pins thereof; an adder disposed between the input connector and the function chip, and comprising at least three input pins and at least three output pins, the input pins being connected to the address pins of the input connector in one-to-one correspondence, the output pins being connected to the address pins of the function chip; and an output connector, comprising at least three address pins and plural data pins, the address pins being connected to the output pins of the adder, the data pins being separately connected to the data pins of the input connector.

Other objects, advantages and novel features of the present invention will be drawn from the following detailed description of preferred embodiments of the present invention with the attached drawings, in which:

DETAILED DESCRIPTION OF PREFERRED EMBODIMENTS OF THE INVENTION

Figure 1:
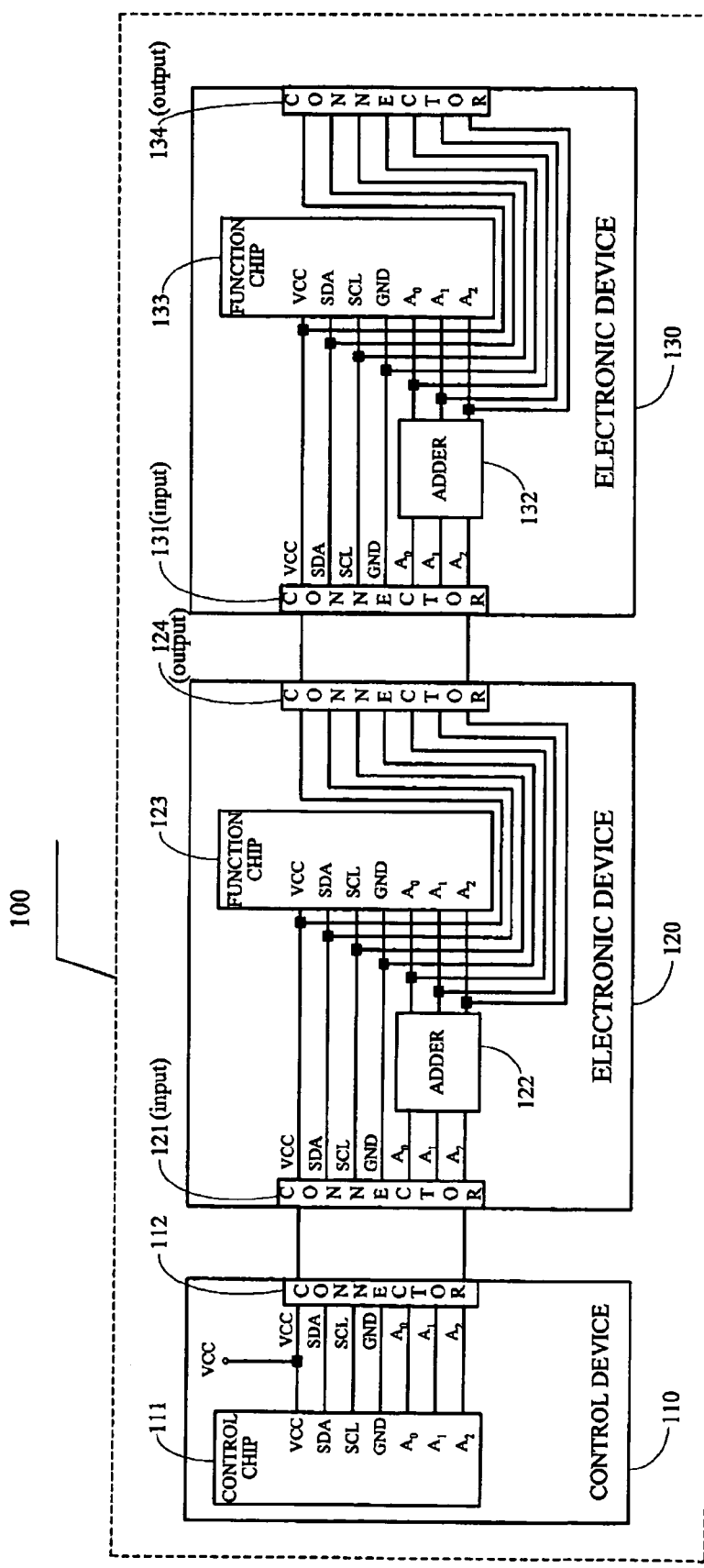
FIG. 1 is a schematic diagram of a system for expandably connecting electronic devices in accordance with the preferred embodiment of the present invention.
Figure 2:
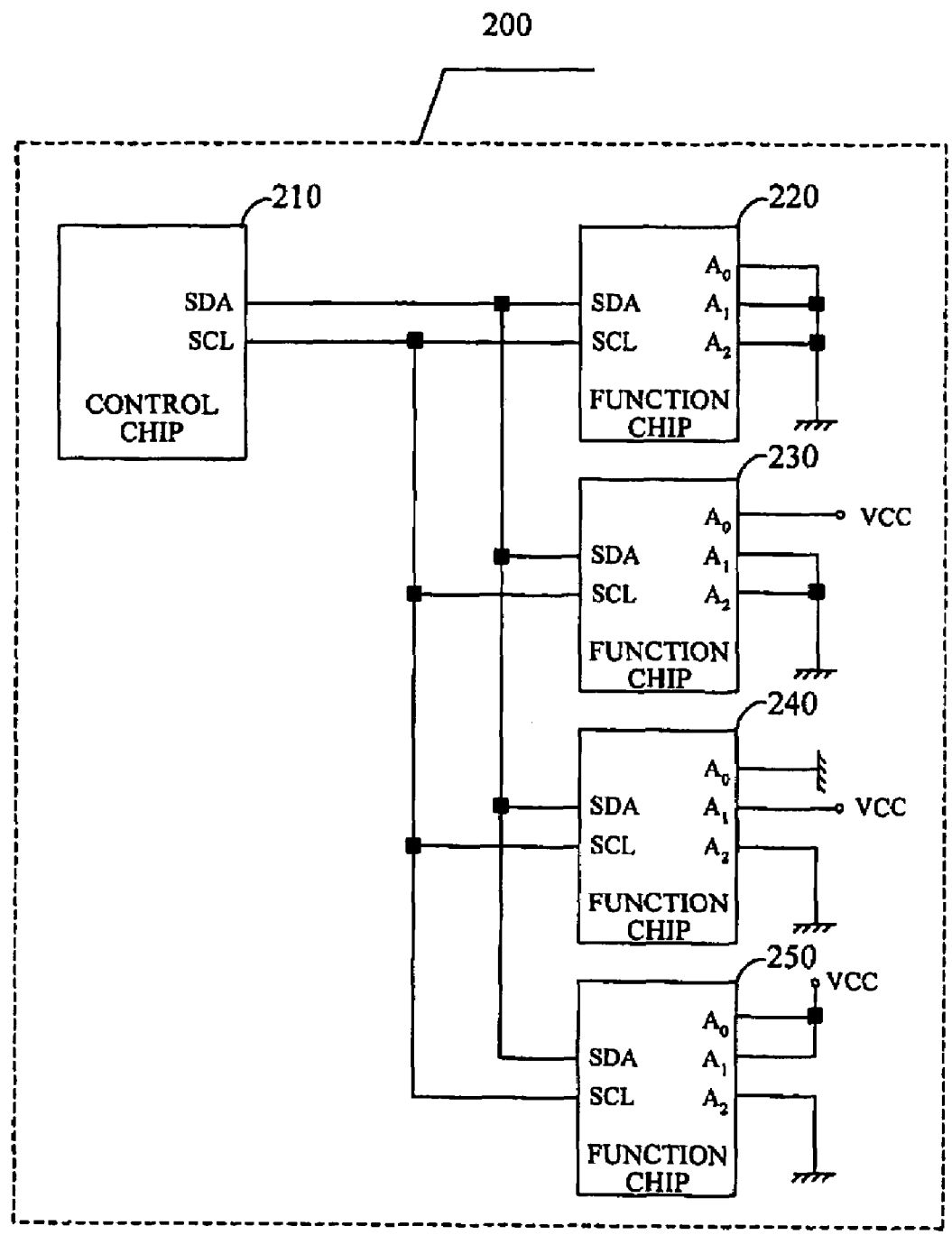
FIG. 2 is a schematic diagram of a conventional system for expandably connecting electronic devices.

FIG. 1 is a schematic diagram of a system 100 for expandably connecting electronic devices in accordance with the preferred embodiment of the present invention. The system 100 comprises a control device 110, and two electronic devices 120 and 130. For the sake of simplicity, only the two electronic devices 120 and 130 are provided in the system 100. The electronic device 120 is connected to the control device 110, and the electronic device 130 is connected to the electronic device 120.

The control device 110 comprises a connector 112 and a control chip 111. The control chip 111 and the connector 112 respectively comprise a ground (GND) pin, a Serial Data (SDA) pin, a Serial Clock (SCL) pin, a VCC pin connected to a VCC source, and three address pins. All the pins of the control chip 111 are respectively connected to those of the connector 112 in one-to-one correspondence.

The electronic device 120 comprises of an input connector 121, a function chip 123, an output connector 124, and an adder 122 disposed between the input connector 121 and the function chip 123. The adder 122 has three input pins and three output pins. The input pins are separately connected to three address pins of the input connector 121, and the output pins are separately connected to three address pins of the output connector 124. The output pins of the adder 122 are also connected to three address pins of the function chip 123, for transmitting a generated address. The input connector 121 is provided to connect with the connector 112 of the control device 110. Besides the three address pins, the input connector 121 comprises a GND pin, an SDA pin, an SCL pin, and a VCC pin. Except for the address pins of the input connector 121, all the other pins thereof are respectively connected to corresponding pins of the function chip 123 and the output connector 124 in one-to-one correspondence. In the preferred embodiment of the present invention, the function chip 123 is a sensor for detecting physical or chemical changes, and the adder 122 is a binary adder.

The electronic device 130 has a structure similar to that of the electronic device 120, and comprises an input connector 131, an adder 132, a function chip 133, and an output connector 134. The input connector 131 is connected to the output connector 124 of the electronic device 120 for transmitting an address from the adder 122 to the adder 132.

At the beginning of assigning addresses to the devices 120 and 130, the control chip 111, a kernel component of the control device 110, transmits a first address to the connector 112. The first address is generated by relevant programs run in the control chip 111.

Subsequently, the input connector 121 of the device 120 transmits the first address to the adder 122 via the three address pins thereof. The adder 122 adds 1 to the first address, and transmits the result to the function chip 123. Thus, the function chip 123 obtains a second address that is the first address plus 1. The second address is also sent to the adder 132 of the electronic device 130 by way of the output connector 124 and the input connector 131.

When the second address is transmitted to the adder 132 via the input connector 131, the adder 132 adds 1 to the second address, and thus generates a third address. Then the third address is transmitted to the function chip 133, and is used as a bus address of the electronic device 130. Thus the electronic device 130 obtains a unique address other than that of the electronic device 120.

In other embodiments of the present invention, the number of address pins of each electronic device may be other than three, according to practical requirements. Thus, different numbers of electronic devices can be connected to the control device 110. According to the present invention, a new electronic device can be added to the system, or an old electronic device can be removed from the system, without altering the configuration of other electronic devices in the system.

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. An electronic device for being expandably connected to a computing system, comprising:
    an input connector, comprising at least three address pins and plural data pins;
    a function chip, comprising address pins and data pins corresponding to those of the input connector, and directly connected to the input connector by the data pins thereof;
    an adder disposed between the input connector and the function chip, and comprising at least three input pins and at least three output pins, the input pins being connected to the address pins of the input connector in the electronic device in one-to-one correspondence, the output pins being connected to the address pins of the function chip; and
    an output connector, comprising at least three address pins and plural data pins, the at least three address pins being connected to the output pins of the adder in one-to-one correspondence, the data pins being respectively connected to the data pins of the input connector, wherein the function chin is a sensor.

2. The electronic device as recited in claim 1, wherein the adder is a binary adder.

3. The electronic device as recited in claim 1, wherein the adder is provided for generating an address for the electronic device.

4. The electronic device as recited in claim 3, wherein the address pins of the output connector are connected to the output pins of the adder for transmitting the generated address to another electronic device.

5. A system for expandably connecting electronic devices, the system comprising:
    a control device, comprising:
        a control chip, comprising at least three address pins and plural data pins;
        a connector, comprising address pins and data pins corresponding to those of the control chip;
    at least one electronic device, said electronic device comprising:
        an input connector, comprising at least three address pins and plural data pins respectively connected to corresponding pins of the connector of the control device:
        a function chip, comprising address pins and data pins corresponding to those of the input connector, and directly connected to the input connector via the data pins thereof; and
        an adder disposed between the input connector and the function chip, and comprising at least three input pins and at least three output pins, the input pins being connected to the address pins of the input connector in one-to-one correspondence, the output pins being connected to the address pins of the function chip;
        an output connector, comprising at least three address pins and plural data pins, the address pins being connected to the output pins of the adder in one-to-one correspondence, the data pins being respectively connected to the data pins of the input connectors, wherein the function chip of the electronic device is a sensor.

6. The system for expandably connecting electronic devices as recited in claim 5, wherein the control chip of the control device is provided for controlling signal transmission.

7. The system for expandably connecting electronic devices as recited in claim 5, wherein the connector of the control device is connected to the input connector via a cable or a wire.

8. The system for expandably connecting electronic devices as recited in claim 5, wherein the adder of the electronic device is a binary adder.

9. The system for expandably connecting electronic devices as recited in claim 5, wherein the adder of the electronic device is provided for generating an address for the electronic device.

10. The system for expandably connecting electronic devices as recited in claim 5, wherein the address pins of the output connector are connected to the output pins of the adder for transmitting the generated address to another electronic device.

* * * * *